(12) United States Patent
Martisauskas

(10) Patent No.: US 10,877,615 B2
(45) Date of Patent: *Dec. 29, 2020

(54) REDUCING THE BORDER AREA OF A DEVICE

(71) Applicant: Apple Inc., Cupertino, CA (US)

(72) Inventor: Steven J. Martisauskas, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,207

(22) Filed: Nov. 6, 2019

(65) Prior Publication Data

US 2020/0073501 A1    Mar. 5, 2020

Related U.S. Application Data

(63) Continuation of application No. 15/940,580, filed on Mar. 29, 2018, now Pat. No. 10,474,268, which is a continuation of application No. 15/591,987, filed on May 10, 2017, now Pat. No. 9,933,875, which is a continuation of application No. 14/445,849, filed on Jul. 29, 2014, now Pat. No. 9,652,096, which is a continuation of application No. 13/229,120, filed on Sep. 9, 2011, now Pat. No. 8,804,347.

(51) Int. Cl.
| | |
|---|---|
| *H05K 1/00* | (2006.01) |
| *G06F 3/044* | (2006.01) |
| *G06F 1/16* | (2006.01) |
| *G06F 3/041* | (2006.01) |

(52) U.S. Cl.
CPC .......... *G06F 3/0446* (2019.05); *G06F 1/1643* (2013.01); *G06F 1/1652* (2013.01); *G06F 3/0412* (2013.01); *G06F 3/04164* (2019.05); *G06F 2203/04102* (2013.01); *G06F 2203/04103* (2013.01); *Y10T 29/49155* (2015.01)

(58) Field of Classification Search
USPC ........................................................ 361/749
See application file for complete search history.

(56) References Cited

U.S. PATENT DOCUMENTS

| | | |
|---|---|---|
| 4,066,855 A | 1/1978 | Zenk |
| 4,085,302 A | 4/1978 | Zenk et al. |

(Continued)

FOREIGN PATENT DOCUMENTS

| | | |
|---|---|---|
| CN | 101145793 | 3/2008 |
| EP | 2187443 | 5/2010 |

(Continued)

OTHER PUBLICATIONS

Lee, S. K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Andargie M Aychillhum
(74) *Attorney, Agent, or Firm* — Kendall W. Abbasi

(57) ABSTRACT

A circuit panel of an electronic device is disclosed. The circuit panel includes a substantially flat surface including an active area of the electronic device; a bent border area contiguous with and extending from the active area of the substantially flat surface; and a plurality of traces coupled to the active area and routed in the bent border area.

20 Claims, 6 Drawing Sheets

(56) References Cited

U.S. PATENT DOCUMENTS

| | | |
|---|---|---|
| 5,235,451 A | 8/1993 | Bryan |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 6,956,633 B2 | 10/2005 | Okada et al. |
| 7,015,894 B2 | 3/2006 | Morohoshi |
| 7,034,913 B2 | 4/2006 | Ishida |
| 7,184,064 B2 | 2/2007 | Zimmerman et al. |
| 7,453,542 B2 | 11/2008 | Muramatsu et al. |
| 7,541,671 B2 | 6/2009 | Foust et al. |
| 7,593,086 B2 | 9/2009 | Jeong et al. |
| 7,593,087 B2 | 9/2009 | Jang |
| 7,663,607 B2 | 2/2010 | Hotelling et al. |
| 7,767,048 B2 | 8/2010 | Kanbayashi |
| 7,787,917 B2 | 8/2010 | Aoki et al. |
| 7,834,451 B2 | 11/2010 | Lee et al. |
| 7,936,405 B2 | 5/2011 | Kitagawa |
| 8,134,675 B2 | 3/2012 | Kawaguchi et al. |
| 8,194,048 B2 | 6/2012 | Oowaki |
| 8,723,824 B2 | 5/2014 | Myers et al. |
| 8,724,304 B2 | 5/2014 | Raff et al. |
| 8,787,016 B2 | 7/2014 | Rothkopf et al. |
| 8,816,977 B2 | 8/2014 | Rothkopf et al. |
| 8,929,085 B2 | 1/2015 | Franklin et al. |
| 8,934,228 B2 | 1/2015 | Franklin et al. |
| 8,947,627 B2 | 2/2015 | Rappoport et al. |
| 9,098,242 B2 | 8/2015 | Rappoport et al. |
| 9,110,320 B2 | 8/2015 | Chen et al. |
| 9,178,970 B2 | 11/2015 | Lynch |
| 9,195,108 B2 | 11/2015 | Park et al. |
| 9,400,576 B2 | 7/2016 | Chen et al. |
| 2005/0285990 A1 | 12/2005 | Havetka et al. |
| 2006/0026521 A1 | 2/2006 | Hotelling et al. |
| 2006/0170634 A1 | 8/2006 | Kwak et al. |
| 2006/0197753 A1 | 9/2006 | Hotelling |
| 2007/0148831 A1 | 6/2007 | Nagata et al. |
| 2008/0023217 A1 | 1/2008 | Hagiwara |
| 2008/0117376 A1 | 5/2008 | Takenaka |
| 2009/0027896 A1 | 1/2009 | Nishimura et al. |
| 2009/0167171 A1 | 7/2009 | Jung et al. |
| 2009/0256471 A1 | 10/2009 | Kim et al. |
| 2009/0284688 A1 | 11/2009 | Shiraishi et al. |
| 2010/0007817 A1 | 1/2010 | Kim |
| 2010/0026952 A1 | 2/2010 | Miura et al. |
| 2010/0066724 A1 | 3/2010 | Huh et al. |
| 2010/0200539 A1 | 8/2010 | Yun et al. |
| 2010/0208190 A1 | 8/2010 | Yoshida |
| 2010/0225624 A1 | 9/2010 | Fu et al. |
| 2010/0315399 A1 | 12/2010 | Jacobson et al. |
| 2010/0328268 A1 | 12/2010 | Teranishi et al. |
| 2011/0007042 A1 | 1/2011 | Miyaguchi |
| 2011/0012845 A1 | 1/2011 | Rothkopf |
| 2011/0068776 A1 | 3/2011 | Yokota et al. |
| 2011/0086680 A1 | 4/2011 | Kim et al. |
| 2011/0227846 A1 | 9/2011 | Imazeki |
| 2012/0062447 A1 | 3/2012 | Tseng et al. |
| 2012/0092273 A1 | 4/2012 | Lyon et al. |
| 2012/0127075 A1 | 5/2012 | Kholaif |
| 2012/0127087 A1 | 5/2012 | Ma |
| 2012/0146886 A1 | 6/2012 | Minami et al. |
| 2012/0193204 A1 | 8/2012 | Jiang et al. |
| 2012/0218219 A1* | 8/2012 | Rappoport .......... H01L 27/3276 345/174 |
| 2012/0242588 A1 | 9/2012 | Myers et al. |
| 2012/0313238 A1 | 12/2012 | Sato et al. |
| 2012/0313859 A1 | 12/2012 | Apgar et al. |
| 2013/0043582 A1 | 2/2013 | Haba et al. |
| 2013/0081756 A1 | 4/2013 | Franklin et al. |
| 2013/0082984 A1 | 4/2013 | Drzaic et al. |
| 2013/0140965 A1 | 6/2013 | Franklin et al. |
| 2014/0092338 A1 | 4/2014 | Miyazaki et al. |

FOREIGN PATENT DOCUMENTS

| | | |
|---|---|---|
| EP | 2523067 | 11/2012 |
| JP | H07-092480 | 4/1995 |
| JP | H09-064488 | 3/1997 |
| JP | H09-080406 | 3/1997 |
| JP | 9321083 | 12/1997 |
| JP | 2000-163031 | 6/2000 |
| JP | 2002-342033 | 11/2002 |
| JP | 2007-047961 | 2/2007 |
| JP | 2009-216810 | 9/2009 |
| JP | 2009-251785 | 10/2009 |
| JP | 2010060866 | 3/2010 |
| JP | 2010060866 A | 3/2010 |
| JP | 2011-065614 | 3/2011 |
| JP | 2011-085982 | 4/2011 |
| KR | 10-2010-0137483 | 12/2010 |
| WO | 9604682 | 2/1996 |
| WO | 0169577 | 9/2001 |
| WO | 2009075574 | 6/2009 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine D.H. (May 1992). "Combing Gestures and Direct Manipulation," CHI '92, pp. 659-660.

Westerman, W. (Spring 1999). "Hand Tracking, Finger Identification, and Chordic Manipulation on a Multi-Touch Surface" A Dissertation Submitted to the Faculty of the University of Delaware in Partial Fulfillment of the Requirements for the Degree of Doctor of Philosophy in Electrical Engineering, 364 pages.

* cited by examiner

REDUCING THE BORDER AREA OF A DEVICE

This application is a continuation of U.S. patent application Ser. No. 15/940,580, filed Mar. 29, 2018, which is a continuation of U.S. patent application Ser. No. 15/591,987, filed May 10, 2017, now U.S. Pat. No. 9,933,875, which is a continuation of U.S. patent application Ser. No. 14/445,849, filed Jul. 29, 2014, now U.S. Pat. No. 9,652,096, which is a continuation of U.S. patent application Ser. No. 13/229,120, filed Sep. 9, 2011, now U.S. Pat. No. 8,804,347, all of which are hereby incorporated by reference herein in their entireties.

FIELD

This relates generally to the fabrication of an electronic device, and more particularly, to bending one or more edges of a touch sensor panel and/or a display panel of an electronic device to reduce the non-interactive border area of the device.

BACKGROUND

In recent years, mobile electronic devices have become hugely popular due to their portability, versatility, and ease-of-use. Although there are many different types of mobile electronic devices, such as smart phones, portable music/video players, and tablet personal computers (PCs) currently available on the market, most of them share some basic components. In particular, touch sensor panels, touch screens, and the like have become available as input devices for various mobile electronic devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel or an OLED panel, that can be positioned partially or fully behind the touch sensor panel so that the touch-sensitive surface can cover at least a portion of the viewable area of the display device.

Given that the size of a typical mobile electronic device is relatively small compared to a laptop or desktop computer, it is often desirable to maximize the display area of mobile electronic devices to increase their user-friendliness. For devices with a touch screen, an increased display area can also provide a larger touch-active area. Typically, the display/touch-active area of a mobile electronic device is enclosed partially or fully by a border area. This border area is often reserved for routing signals from the display and/or touch sensor panel to the circuitry of the device. Although the border area in some touch-based devices may already be relatively small compared to the display/touch-active area, further reducing the border area would nevertheless help maximizing the space available for the display/touch-active area of the device without increasing the overall size of the device.

SUMMARY

This relates to methods and systems for reducing the border areas of an electronic device so as to maximize the display/interactive touch areas of the device. In particular, a flexible substrate can be used to fabricate the display panel and/or the touch sensor panel (referred to collectively herein as a "circuit panel") of a mobile electronic device so that the edges of the display panel and/or the touch sensor panel can be bent. Bending the edges can reduce the width (or length) of the panel, which in turn can allow the overall device to be narrower without reducing the display/touch-active area of the device. Alternatively, the display/touch-active area of the device can be widened without increasing the overall size of the device. In some embodiments, as will be discussed in detail below, the flexible substrate can be patterned with perforations or made thinner at certain areas during the manufacturing process to reduce the residual stress when the flexible substrate is bent.

DETAILED DESCRIPTION

In the following description of preferred embodiments, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

This relates to methods and systems for reducing the border areas of an electronic device so as to maximize the display/interactive touch areas of the device. In particular, a flexible substrate can be used to fabricate the display panel and/or the touch sensor panel (referred to collectively herein as a "circuit panel") of a mobile electronic device so that the edges of the display panel and/or the touch sensor panel can be bent. Bending the edges can reduce the width (or length) of the panel, which in turn can allow the overall device to be narrower without reducing the display/touch-active area of the device. Alternatively, the display/touch-active area of the device can be widened without increasing the overall size of the device. In some embodiments, as will be discussed in detail below, the flexible substrate can be patterned with perforations or made thinner at certain areas during the manufacturing process to reduce the residual stress when the flexible substrate is bent.

An overview of the underlying structure of a conventional mobile electronic device is provided first in the following paragraphs before embodiments of the present disclosure are discussed in detail.

Figure 1:
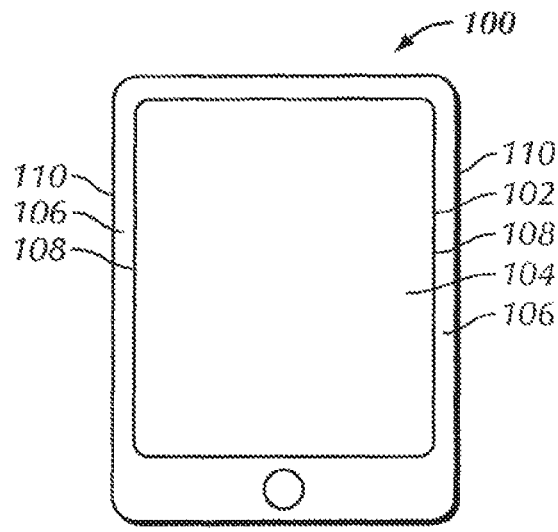
FIG. 1 illustrates a conventional mobile electronic device with a touch screen display.

FIG. 1 illustrates a conventional mobile electronic device 100 with a touch screen display 102. The illustrated device 100 can be a tablet PC such as an iPad® by Apple Inc. of Cupertino, Calif. It should be understood that the device of FIG. 1 can also be other types of mobile electronic devices, such as a smartphone or a portable music player. As shown, the touch screen display 102 can occupy a large portion of the front surface of the device 100. In this device, the entire touch screen display 102 can be touch-sensitive for detecting single or multi-touch input from a user. The display/touch-active area will be collectively referred to hereinafter as the active area 104 of the device 100.

As shown in FIG. 1, although the active area 104 can span much of the width of the device 100, there can still be a border area 106 on both sides of the active area 104. The border area 106 can include the areas between an edge 108 of the active area 104 and the product enclosure edge 110. Depending on the specification of the device, the width of the border areas 106 can vary. In some devices with a touch screen display, such as the one shown in FIG. 1, the border area 106 may have to be wide enough so that metal traces connecting the underlying display panel to the processing circuitry of the device 100 can be routed within the border area 106 and hidden from view. This can occupy valuable space that could otherwise be used for expanding the active area 104 of the device. More details regarding the routing of metal traces are provided in later paragraphs.

Figure 2:
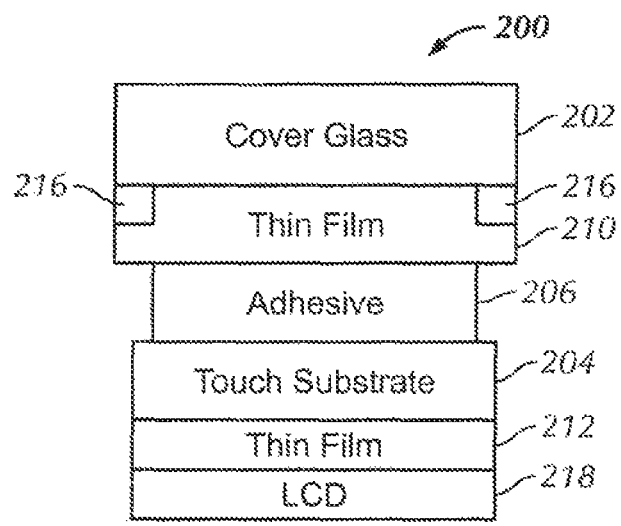
FIG. 2 is a side view illustrating the various layers of an exemplary touch screen display, such as the one in the device of FIG. 1.

FIG. 2 provides a side view of the various layers of an exemplary touch screen display, such as the one in the device of FIG. 1. The multilayer stack 200 includes a top cover glass 202 laminated to a touch substrate 204 using adhesive 206 deposited on top of the touch substrate 204. As shown in FIG. 2, the cover glass 202 can have slightly larger dimensions than the touch substrate 204. For example, the cover glass 202 can cover substantially the whole front surface of the device. By comparison, the touch substrate 204 may have a size roughly that of the display of the device. In other words, the length and width of the cover glass 202 can be longer than that of the touch substrate 204, respectively.

In some embodiments, thin film layers 210, 212 can be coated on the bottom surface of the cover glass 202 and/or the bottom surface of the touch substrate 204 separated by the touch substrate 204 and the adhesive layer 206. The two thin film layers may be patterned ITO layers that form drive and sense lines of a capacitive touch sensor. The sense lines may be formed in the thin film layer 210 coated on the bottom surface of the top cover 202 and the drive lines may be formed in the thin film layer 212 coated on the bottom surface of the touch substrate 204, or vice versa. In some embodiments, by putting the drive and sense lines on different surfaces of the touch substrate 204, the touch substrate 204 can become a capacitive touch sensor panel that is capable of sensing touches on the top surface of the cover glass 202. Changes in capacitance between each crossing of a drive line and a sense line in those thin film layers 210, 212 can be measured to determine whether a touch has occurred at certain locations on the top surface of the cover glass 202.

Figure 3:
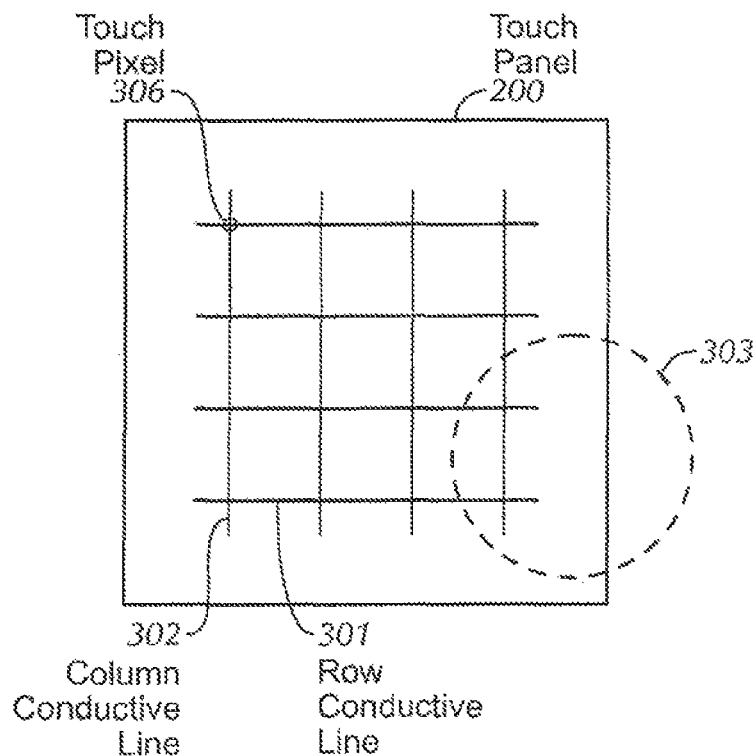
FIG. 3 provides a top view of the exemplary touch sensor panel of FIG. 2.

FIG. 3 provides a top view of the touch sensor panel 200 of FIG. 2. As illustrated, the touch sensor panel 200 includes both conductive rows 301 and columns 302 that can form a matrix of touch pixels 306 at their crossing points. Though FIG. 3 depicts the conductive elements 301, 302 in rows and columns, other configurations of conductive elements are also possible according to various embodiments.

Referring back to FIG. 2, the multilayer stack 200 can also include black mask 216 (a type of cosmetic plate or covering) formed on the bottom surface of the cover glass 202 and around the outer edge of the thin film layer 210. The black mask 216 is typically opaque (though not necessarily black) and can be used to keep the non-transparent metal traces (not shown in FIGS. 2 and 3) beneath it hidden from view. The metal traces can connect the drive lines or sense lines to the touch circuitry located in another part of the device so that touch signals (i.e., capacitance measurement at the touch pixels) can be routed from the touch sensor panel 200 to the touch circuitry for processing. The metal traces are discussed in more detail below in view of FIG. 4.

In some embodiments, an additional layer of AR film, shield film, or LCM 218 may be formed on the bottom of the touch sensor panel 200, formed over the thin film layer 212 on the bottom surface of the touch substrate 204. A shield film 218 may be used to block interfering electrical fields in the vicinity of the touch substrate 204 so that the measured capacitance data can accurately represent the characteristics of one or more touches detected on the top surface of the top cover 202. A LCM 218 can be used as the display of the touch screen. Because the cover glass 202, the thin film layers 210, 212, the adhesive 206, and the touch substrate 204 can all be formed from substantially transparent material, the middle part of the touch sensor panel 200 where the black mask 226 does not reach may be substantially see-through. This can allow the LCM display 218 underneath the touch sensor panel 200 to be visible from above the top cover 202. The thin film layer (conductive rows and columns) 210 can extend beyond the visible area at both ends so that the end portions of the thin film layer 210 can be hidden under the black mask 216. This is illustrated in more detail in FIG. 4 and discussed in the paragraphs below.

Figure 4:
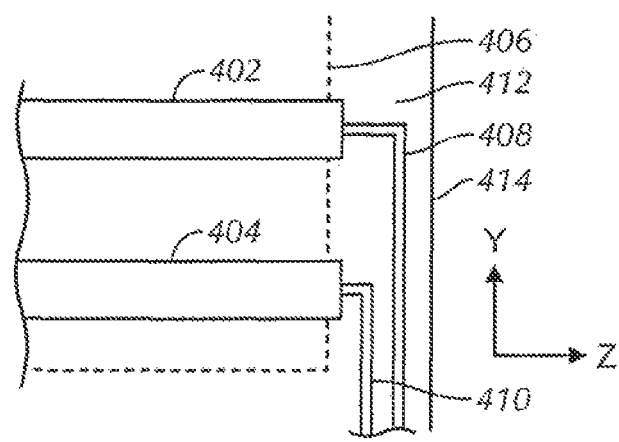
FIG. 4 provides a magnified view of a section of the exemplary touch sensor panel of FIG. 3.

FIG. 4 provides a magnified view of a section 303 of the touch sensor panel 200 of FIG. 3. In particular, FIG. 4 illustrates that the conductive rows 402, 404 can extend beyond the edge of the active area 406 indicated by dotted lines. Each of the conductive rows 402, 404 can be connected to a metal trace 408, 410, respectively. The metal traces 408, 410 can route touch signals (e.g., capacitance measurements) from the conductive rows 402, 404 to a touch circuitry (not shown) of the device for further processing. As illustrated in FIG. 4, the metal traces 408, 410 can be routed in the border area 412 between the edge of the active area 406 and the product enclosure edge 414. To prevent the metal traces 408, 410 from crossing each other's path, each of traces 408, 410 can be first routed in the x-direction (i.e., along the width) of the device in various length and then in parallel in the y-direction (i.e., along the length) of the device, as shown in FIG. 4. This requires that the border area 412 of the device be wide enough to house all the metal traces 408, 410. For this reason, the border area 412 can take up a significant area on the surface of the device, especially in relatively large devices such as tablet PCs, which typically include more conductive rows on the underlying touch sensor panel. This in turn can negatively affect the space that can be used as the active area (i.e., the display/touch-active area) in a device with a fixed overall width. The same issue can be caused by the routing traces for the display panel. Thus, to provide better usability, it is desirable to reduce the border area in devices such as the one shown in FIG. 1 to maximize its active area. In other words, by narrowing the border area, the touch screen of the device can be made larger. The following paragraphs introduce various embodiments of this disclosure that can maximize the active area of a device without increasing its overall dimensions.

Embodiments of the present disclosure can significantly reduce the non-interactive border areas of a mobile electronic device so that a larger area of the device surface can be used as the active area for display and/or receiving touch-based input. In various embodiments, this can be achieved by using a flexible substrate to serve as the base substrate for the touch sensor panel and/or the display panel. During the manufacturing process, the flexible substrate can be bent near its edge so that the border area in which the metal traces connecting the conductive rows and/or columns to the touch circuitry are routed takes little, if any, space in the x-dimension (width) of the device. This in turn creates more space that can be used as the active area (e.g., display and/or touch-active area) on the device surface. In other embodiments, the substrate may not be flexible, but instead may be initially formed in a bent configuration. Although the exemplary embodiments below describe bending one or both side edges of a touch sensor panel, it should be understood that the other edges (e.g., the top and bottom edges) of the panel can be similarly bent to increase the other dimensions of the active area. Although the embodiments describe bending the border areas of a touch sensor panel in a touch screen device, it should be understood that the same process can be applied to display panels built on a flexible substrate. Details of some of these embodiments are provided in the following paragraphs in view of FIGS. 5-8.

Figure 5:
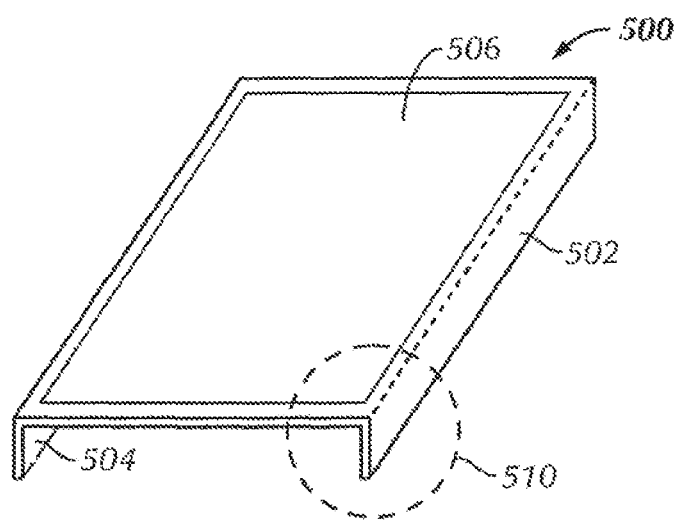
FIG. 5 illustrates a touch sensor panel with bent border areas according to embodiments of the disclosure.

FIG. 5 illustrates a touch sensor panel 500 according to one embodiment of the disclosure. In this embodiment, the touch sensor panel 500 can be fabricated using a flexible substrate such as plastic. Unlike touch sensor panels made from rigid material such as glass, the flexible substrate can allow the touch sensor panel 500 to be bent during the fabrication process. For example, the non-active edges 502, 504 of the touch sensor panel 500 of FIG. 5 can be bent at an angle of approximately 90 degrees. In this embodiment, metal traces (not shown in FIG. 5) connecting the conductive rows (or columns) to the touch circuitry of the device can be routed in the "vertical" border areas 502, 504 of the panel 500. In the embodiment where metal traces are only routed along one side of the touch sensor panel, only one of the edges of the panel needs to be bent.

Figure 6:
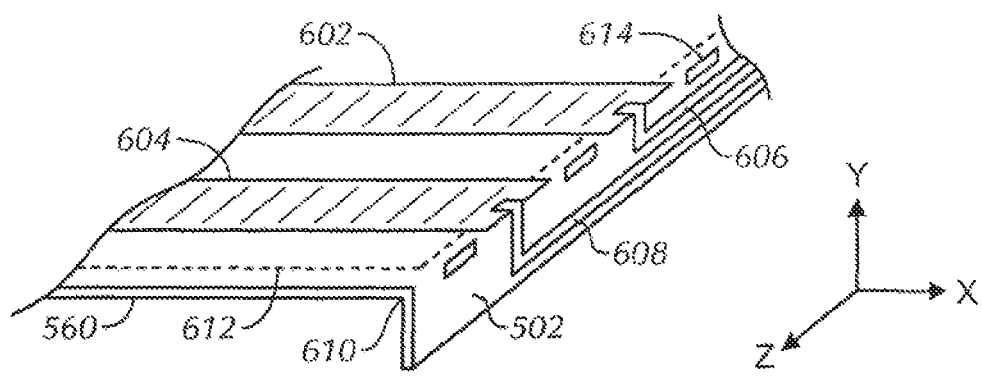
FIG. 6 provides a closer view of the bent border areas of the touch sensor panel of FIG. 5 according to embodiments of the disclosure.

FIG. 6 provides a closer view of one of the bent border areas 510 of the touch sensor panel 500 of FIG. 5. As shown in FIG. 6, the touch sensor panel can have a number of conductive rows 602, 604 patterned on its surface. Each conductive row 602, 604 can be attached a metal trace 606, 608, which can route the touch signals from the conductive row 602, 604 to the touch circuitry of the device. The metal traces 606, 608 can be routed along the surface of the panel. As shown in FIG. 6, the metal traces 606, 608 can be routed from their respective conductive rows 602, 604, first horizontally in the x-direction along the flat surface of the panel 500 until reaching the bent edge 610 of the panel 500.

Preferably, the horizontal routing of the traces is minimum because this allows the active area (indicated in dotted lines) 612 of the touch panel to extend as closely to the bent edge 610 as possible. Following the curvature of the bent edge 610, the traces 606, 608 can then be routed vertically in the y-direction over the bent border area 502 of the panel 500. As shown, the vertical routing distance can be different for each trace 606, 608 so that the traces 606, 608 do not cross over each other. Finally, the metal traces 606, 608 can be routed along the edge of the touch sensor panel in the z-direction of the panel towards the touch circuitry (not shown).

Accordingly, most of the metal traces can be routed along the vertical border area 502 of the panel 500 rather than the horizontal surface of the touch sensor panel 500. This can significantly reduce the space between the edge of the active touch sensing area and the edge of the device. As shown in FIG. 5, almost the entire flat horizontal surface of the touch sensor panel 500 can be occupied by the touch-active area 506 of the panel 500 for sensing touches on the device surface. In other words, the touch-active area 506 can reach the bent edge of the panel 500. As a result, the active area of the touch sensor panel can be made larger without increasing the overall dimension of the device. Alternatively, the device can be made smaller without reducing the touch sensing area of the touch panel.

As mentioned above, the same process can be applied to display panels built on a flexible substrate. That is, the edge of a display panel can be bent to allow for a reduced border between the edge of the visible area of the display and the produce enclosure border. Traces connecting the display to other components of the device can be routed along bent edges of the panel which no longer drives the width-dimension of the device.

In one embodiment, one or more perforations can be patterned along the bent edge 610 of the flexible substrate touch sensor panel to decrease the residual stress on the panel when it is bent. In one embodiment, as illustrated in FIG. 6, perforations 614 can be formed in the areas between metal traces 606, 608 extending from two adjacent conductive rows 602, 604. This can allow the metal traces 606, 608 to be routed through the perforated bent edge region. The perforations can be rectangular, as shown in FIG. 6, circular, or any other shape. The number and size of each perforation can vary depending on, among other factors, the number and routing of the traces, the type of flexible substrate used to fabricate the touch sensor panel, and the angle at which the panel is bent. In some embodiments, the perforations can be large in area and low in number. In other embodiments, the perforations can be small in area, but large in number. The pattern of perforations can also vary in different embodiments. Preferably, the area, size, and location of the perforation are optimized to allow the border areas to be easily bent without putting much stress on or breaking the underlying substrate.

In another embodiment, instead of patterning perforations along the bent edge of the panel, thinning the substrate at selected areas along the bent edge can also achieve the same effect of reducing residual stress on the panel. For example, the perforated areas of FIG. 6 can simply be thinned out instead of perforated. As with perforations, the size, shape and location of the thinned area can vary in different embodiments. For example, the whole bent border area can be thinned throughout.

Figure 7:
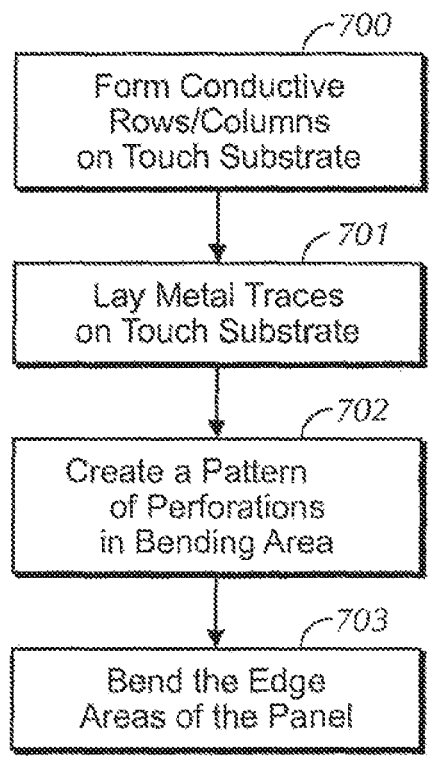
FIG. 7 is a flow chart illustrating an exemplary process of manufacturing a touch sensor panel according to embodiments of the disclosure.

An exemplary process for manufacturing the touch sensor panel 500 of FIG. 6 is illustrated in the flow chart of FIG. 7. During manufacturing, first, the conductive rows or columns can be formed on one of the surfaces of the flexible touch substrate (see reference character 700). This can be done by depositing a layer of conductive material such as ITO on the flexible touch substrate and etching the ITO layer to form the desired pattern of conductive rows or columns. Other well-known methods can also be applied in this step to create the desired pattern of conductive rows or columns. Next, the metal traces can be formed on the flexible touch substrate (see reference character 701). This can be done by depositing a metal layer on top of the conductive layer and creating a pattern of metal traces by etching or using any other suitable method. As shown in FIG. 6 above, each of the metal traces can extend from one end of the conductive rows or columns towards to edge of the touch substrate. In one embodiment, all the metal traces can be parallel to each other.

In the next step, perforations can be created in a predetermined pattern in an area where the touch substrate is to be bent in the subsequent operation (see reference character 702). The perforations can be created using a laser, mechanical die-cut, photo-resist etch process, or any other suitable method. In one embodiment, the perforations can be created in the space between each pair of adjacent metal traces.

In another embodiment, this perforating operation can be performed prior to the conductive traces and/or metal traces being patterned. In the embodiments where the bent area is thinned rather than perforated, operation 702 can be replaced by a thinning operation performed in the same areas of the panel.

After the perforations are created in a pattern (or the thinning operation is performed), the non-active border area of the touch substrate can be bent at a predetermined angle (e.g., 90 degrees) (see reference character 703). The perforations or the thinned areas can reduce the residual stress from the bending of the panel, thus preventing the border area from breaking off. By bending the border area and routing the metal traces in the bent area that no longer drives the width dimension of the device, the border surrounding the active area of the touch sensor panel can be drastically reduced.

The touch substrate can then be affixed to the other layers, such as the one shown in FIG. 2, to form the complete touch screen stack.

Figure 8:
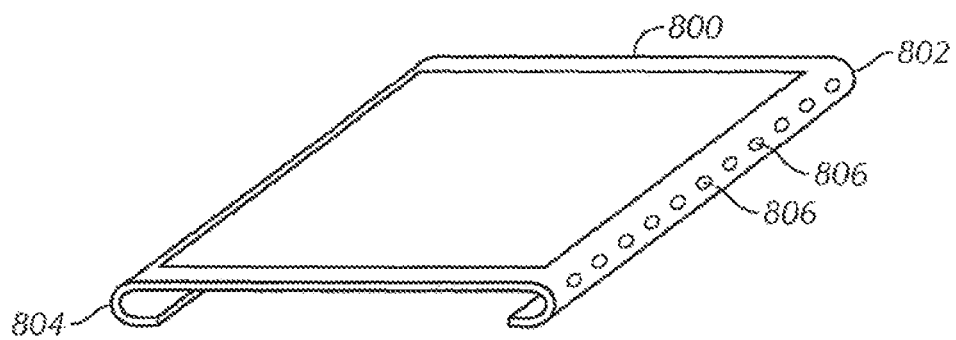
FIG. 8 illustrates an exemplary touch sensor panel with bent border areas according to embodiments of the disclosure.

In FIGS. 5 and 6, although the border area of the touch sensor panel 500 is shown to be bent at an angle of approximately 90 degrees, it should be understood that the border area can be bent at different angles in other embodiments so long as it reduces one of the dimensions (e.g., width or length) of the overall product. For example, FIG. 8 illustrates a touch sensor panel 800 made of a flexible substrate. As shown in the figure, the border areas 802, 804 of the panel 800 can be folded inwards towards the back surface of the panel (i.e., bent at an angle of approximately 180 degrees). In some embodiments, the border areas 802, 804 can wrap around and can be folded back against the back surface of the panel 800. This can achieve the same advantage of allowing the touch active area of the panel to be extended closer to the edge of the device or reducing the overall width of the device. As in the embodiments discussed above, perforations 806 can be patterned in the bent areas to reduce stress, and metal traces can be routed in between the perforations. Alternatively and additionally, the flexible substrate can be thinned in one or more regions to make it easier to fold the border areas.

Figure 9A:
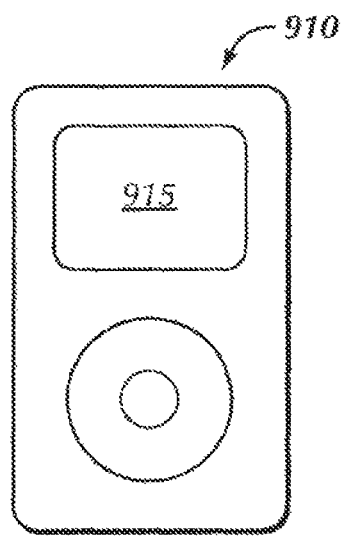
FIG. 9a illustrates an exemplary digital media player having a touch sensor panel with bent border areas and fabricated according to embodiments of the disclosure.

FIG. 9a illustrates exemplary digital media player 910 that can include a touch sensor panel 915, the touch sensor panel having bent border areas to maximize its touch-active area according to embodiments of the disclosure.

Figure 9B:
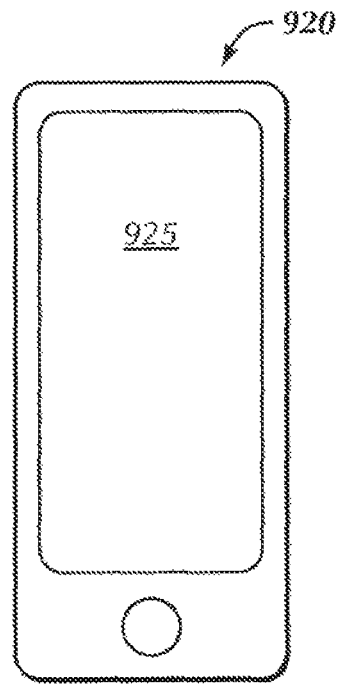
FIG. 9b illustrates an exemplary mobile telephone having a touch sensor panel with bent border areas and fabricated according to embodiments of the disclosure.

FIG. 9b illustrates exemplary mobile telephone 920 that can include a touch sensor panel 925, the touch sensor panel having bent border areas to maximize its touch-active area according to embodiments of the disclosure.

Figure 9C:
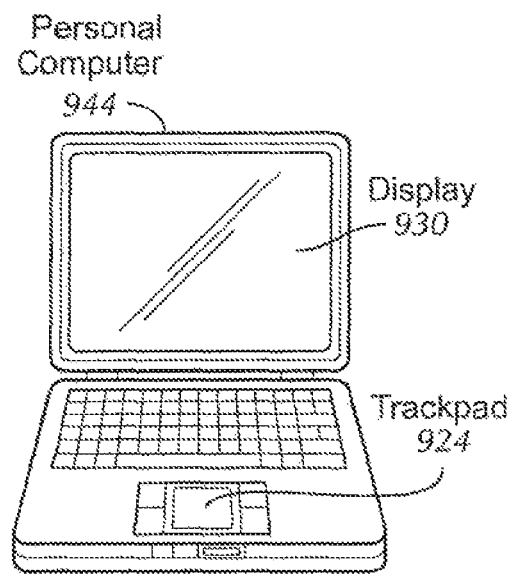
FIG. 9c illustrates an exemplary mobile computer having a touch sensor panel with bent border areas and fabricated according to embodiments of the disclosure.

FIG. 9c illustrates an exemplary personal computer 944 that can include touch sensor panel 924 and display device 930. The touch sensor panel 924 can be a panel fabricated according to embodiments of the disclosure. The display device 930 can also include a touch panel fabricated according to embodiments of the disclosure.

Figure 9D:
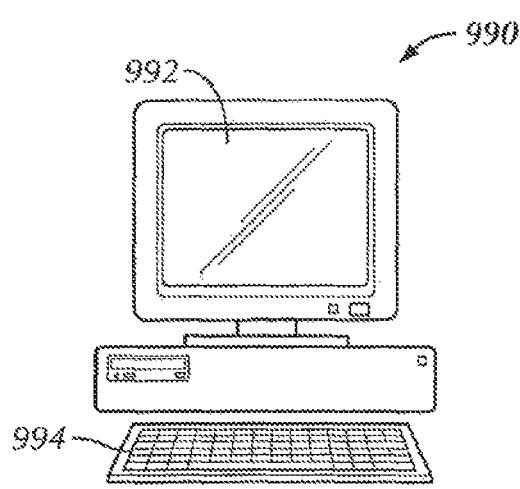
FIG. 9d illustrates an exemplary desktop computer having a touch sensor panel with bent border areas and fabricated according to embodiments of the disclosure.

FIG. 9d illustrates a desktop computer 990 including a display device 992. The display device 992 may include a touch panel fabricated according to embodiments of the disclosure. The desktop computer 990 may also include a virtual keyboard 994 which incorporates a touch panel fabricated according to embodiments of the disclosure.

Figure 10:
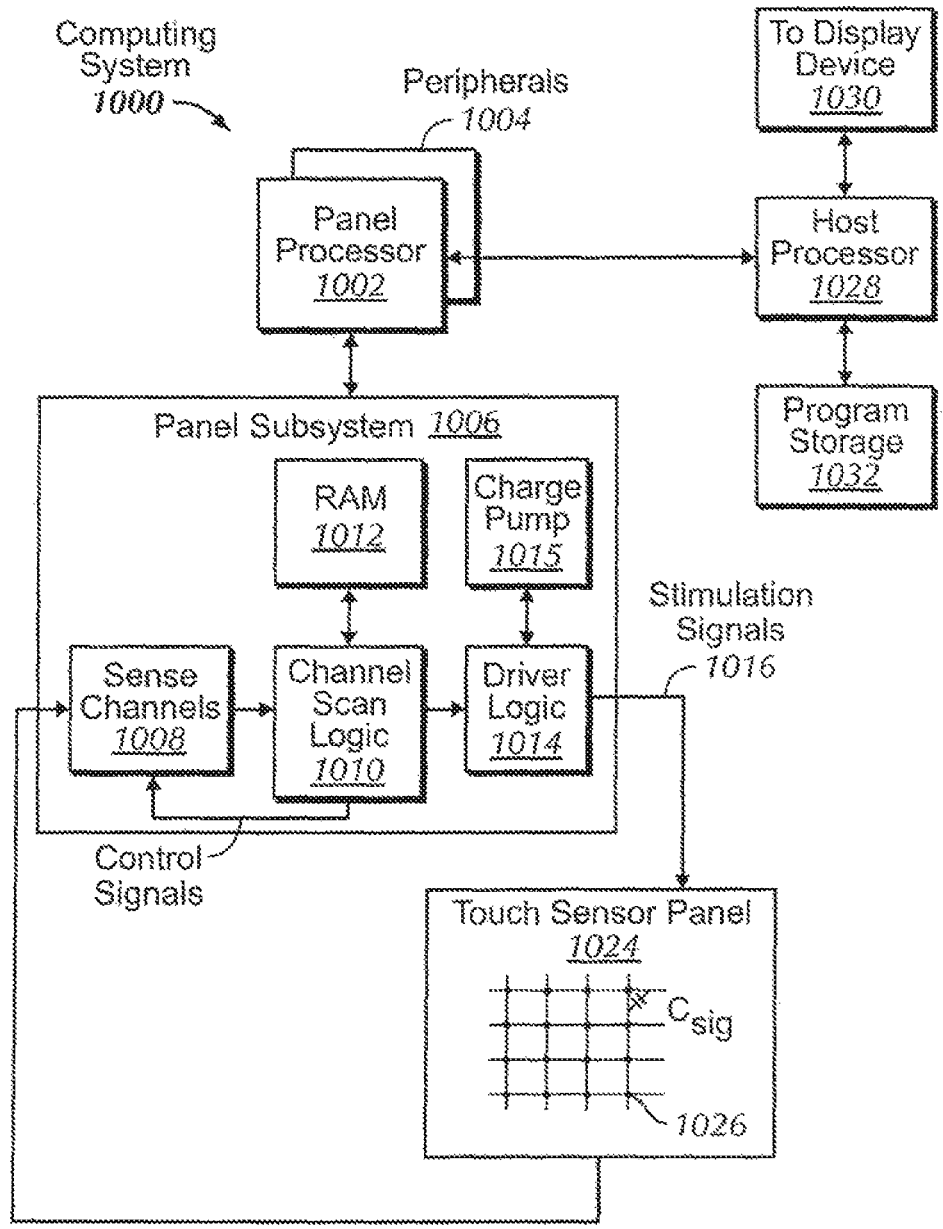
FIG. 10 illustrates an exemplary computing system including a touch sensor panel fabricated according to embodiments of the disclosure.

FIG. 10 illustrates exemplary computing system 1000 that can include one or more touch sensor panels fabricated according to the embodiments of the disclosure described above. Computing system 1000 can include one or more panel processors 1002 and peripherals 1004, and panel subsystem 1006. Peripherals 1004 can include, but are not limited to, random access memory (RAM) or other types of memory or storage, watchdog timers and the like. Panel subsystem 1006 can include, but is not limited to, one or more sense channels 1008, channel scan logic 1010 and driver logic 1014. Channel scan logic 1010 can access RAM 1012, autonomously read data from the sense channels and provide control for the sense channels. In addition, channel scan logic 1010 can control driver logic 1014 to generate stimulation signals 1016 at various frequencies and phases that can be selectively applied to drive lines of touch sensor panel 1024. In some embodiments, panel subsystem 1006, panel processor 1002 and peripherals 1004 can be integrated into a single application specific integrated circuit (ASIC).

Touch sensor panel 1024 can include a capacitive sensing medium having a plurality of drive lines and a plurality of sense lines, although other sensing media can also be used. Either or both of the drive and sense lines can be coupled to a thin glass sheet according to embodiments of the disclosure. Each intersection of drive and sense lines can represent a capacitive sensing node and can be viewed as picture element (pixel) 1026, which can be particularly useful when touch sensor panel 1024 is viewed as capturing an "image" of touch. (In other words, after panel subsystem 1006 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 1024 can drive sense channel 1008 (also referred to herein as an event detection and demodulation circuit) in panel subsystem 1006.

Computing system 1000 can also include host processor 1028 for receiving outputs from panel processor 1002 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1028 can also perform additional functions that may not be related to panel processing, and can be coupled to program storage 1032 and display device 1030 such as an LCD panel for providing a UI to a user of the device. Display device 1030 together with touch sensor panel 1024, when located partially or entirely under the touch sensor panel, can form touch screen 1018.

Note that one or more of the functions described above can be performed by firmware stored in memory (e.g. one of the peripherals 1004 in FIG. 10) and executed by panel processor 1002, or stored in program storage 1032 and executed by host processor 1028. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An electronic device, comprising:
   a transparent cover layer;
   a pixel array that displays images through the transparent cover layer; and
   a touch sensor that detects touch input on the transparent cover layer, wherein the touch sensor comprises touch sensor electrodes on a substrate having first and second curved edges.

2. The electronic device defined in claim 1 wherein the transparent cover layer comprises glass.

3. The electronic device defined in claim 1 wherein the pixel array comprises organic light-emitting diode pixels.

4. The electronic device defined in claim 1 wherein the touch sensor electrodes comprise capacitive touch sensor electrodes.

5. The electronic device defined in claim 4 wherein the capacitive touch sensor electrodes form an active touch area and wherein the active touch area extends to the first and second curved edges of the substrate.

6. The electronic device defined in claim 1 further comprising an additional substrate on which the pixel array is located, wherein the additional substrate has third and fourth curved edges.

7. The electronic device defined in claim 6 wherein the third and fourth curved edges have thinned regions.

8. The electronic device defined in claim 6 wherein the third and fourth curved edges have perforations.

9. The electronic device defined in claim 1 wherein the touch sensor has signal traces on at least one of the first and second curved edges.

10. The electronic device defined in claim 1 wherein the substrate comprises a planar portion and wherein the first and second curved edges bend behind the planar portion.

11. An electronic device, comprising:
    an array of organic light-emitting diode pixels;
    a cover glass overlapping the array of organic light-emitting diode pixels;
    a substrate having a flat portion and a bent edge; and
    an array of capacitive touch sensor electrodes that detect touch input on the flat portion and that extend to the bent edge of the substrate.

12. The electronic device defined in claim 11 wherein the array of organic light-emitting diode pixels, the cover glass, the substrate, and the array of capacitive touch sensor electrodes are laminated together.

13. The electronic device defined in claim 11 wherein the bent edge bends behind the flat portion.

14. The electronic device defined in claim 11 wherein the bent edge comprises perforations.

15. The electronic device defined in claim 11 wherein the bent edge comprises a thinned region.

16. An electronic device, comprising:
    a pixel array;
    a transparent cover layer overlapping the pixel array;
    a substrate having a curved edge; and
    a touch sensor with drive lines and sense lines that form an active touch area on the substrate, wherein the active touch area extends to the curved edge of the substrate.

17. The electronic device defined in claim 16 wherein the transparent cover layer comprises glass and the pixel array comprises organic light-emitting diode pixels.

18. The electronic device defined in claim 16 wherein the pixel array, the transparent cover layer, and the substrate are laminated together.

19. The electronic device defined in claim 16 wherein the substrate has a flat portion and wherein the curved edge bends behind the flat portion.

20. The electronic device defined in claim 19 wherein the curved edge of the substrate has a thinned region.

* * * * *